Sept. 23, 1969      H. M. FORMAN      3,468,412

SHRINK FILM PACKAGES AND PACKAGING METHODS

Filed June 8, 1966

INVENTOR
HAROLD M. FORMAN
BY
Bilker, Kimmelman + Moyerman.
ATTORNEYS.

United States Patent Office 3,468,412
Patented Sept. 23, 1969

3,468,412
SHRINK FILM PACKAGES AND
PACKAGING METHODS
Harold M. Forman, 2510 Grant Road,
Broomall, Pa. 19008
Filed June 8, 1966, Ser. No. 556,041
Int. Cl. B65d 85/00
U.S. Cl. 206—46          2 Claims

ABSTRACT OF THE DISCLOSURE

A method of wrapping and a wrapped package are disclosed which involve the use of a sleeve of mono-axially oriented thermoplastic film (i.e. shrink film). It is critical that the major shrink axis of the film be transverse to the longitudinal extent of the sleeve. An item to be encased is placed within the sleeve with enough excess of sleeve to form ends and the entirety of the overwrapped item is uniformly heated to cause the intermediate portion of the sleeve to shrink tightly about the item and the ends to shrink transversely. The ends may be left as they are; simultaneously cut off and heat sealed; or tucked under the item and heat sealed to the sleeve.

---

This invention pertains to shrink packaging and encompasses both packages and methods of making such packages. More particularly, it pertains to types of shrink film packages called "sleeve wrap" packages or "band wrap" packages and to methods of forming the same.

The techniques, advantages and attributes of shrink packaging are well known to those skilled in the art. The general subject matter is fully discussed in an article entitled "The Growth of Shrink Packaging" by Robert D. Lowry which appears at pages 243 et seq. in the 1965 edition of "The Modern Packaging Encyclopedia."

These packaging techniques take advantage of the unique properties of various axially oriented thermoplastic films. These films, when heated for a brief time to temperatures between 150° F. and 450° F. shrink in either or both length and width. The article referred to describes these films and their properties.

For a clear understanding of the instant invention, it is important to establish nomenclature with respect to these shrink films. A film which shrinks in both length and width is henceforth herein termed a "bi-axially" oriented film. A film which shrinks in either length or width but not in both is termed a "mono-axially" oriented film. These terms are not absolute and a "mono-axially" oriented film which shrinks 40 to 50 percent along its major shrink axis will experience some shrinking, on the order of magnitude of 5 or 10 percent along its minor axis. Accordingly, a "mono-axially" oriented film is one which shrinks predominantly but not necessarily exclusively along one axis. The differences between a given "mono-axial" and "bi-axial" film are not chemical differences but are rather differences which have been created by physical manipulation (e.g. casting or stretching) of the film during its manufacture.

Chemically it is intended to encompass in the term "thermoplastic film" all such films which are adapted for use in connection with shrink packaging. Illustrative of such materials are those listed in the table on page 243 of the article cited above. Such materials include, for example, polyester (e.g. such as that sold under the trademark HS Mylar); regular, cross-linked and irradiated polyethylenes; polypropylene; polystyrene; polyvinyl chloride; polyvinylidene chloride copolymers and rubber hydrochlorides. Further included are mono-axially oriented polyethylenes of the type described (column 2, lines 5 to 30 inclusive) in U.S. Patent No. 3,215,266; and polyvinyls of the type described in U.S. Patent No. 3,175,752.

Another important characteristic of these shrink films, in addition to their ability to contract when heated, is their ability to heat-seal to themselves. This characteristic is relied upon in many shrink packaging applications, including the applications of the instant invention, for forming heat-sealed edges which constitute the sealed perimetrical portion of a given package. The same characteristic is also relied upon for sealing juxtaposing planar surfaces of the film as, for example, an end flap which is tucked back onto the package. With few exceptions, shrink films have a natural heat-sealing capability. Where no such natural capability exists, it may be imparted by coating the shrink film with compounds (e.g. polyvinyl chloride) capable of bonding under heat and pressure.

In order to appreciate the advantages of the instant invention one must understand fully customary sleeve wrap techniques. The objects of the invention, though stated immediately below, will be better appreciated when consideration is given to the packages described below in connection with certain of the figures of this application. Nonetheless, a preliminary statement will be made of the objects of the invention.

It is an object of the invention to produce a band-wrapped or sleeve-wrapped heat-sealed package which is neat in appearance, has no bulging corner portions, and no gathered excess of material.

Another object of the invention is to provide a method of packaging, utilizing relatively inexpensive mono-axially oriented film (e.g. inexpensive relative to bi-axially oriented film).

It is a further object of the invention to provide methods of making packages which are neat and which utilize inexpensive film which methods can be performed on existing packaging equipment with no modifications in machinery necessary.

Still another object of the invention is to provide inexpensive, rugged packages suitable for mono-axially oriented heat-sealing thermoplastic films which are neat in appearance, simply and inexpensively made and contain no unsightly bulges or clusters of material.

These and other objects of the invention will be apparent to those skilled in the packaging art from a consideration of the description which follows when read in conjunction with the drawing. In the drawing, wherein like reference numerals designate like parts:

Figure 1A:
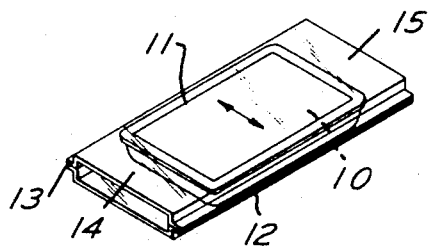
FIGURE 1A represents a perspective view of the first step in a method incorporating prior art techniques and shows an object which has been sleeve wrapped with a mono-axial shrink film.
Figure 1B:
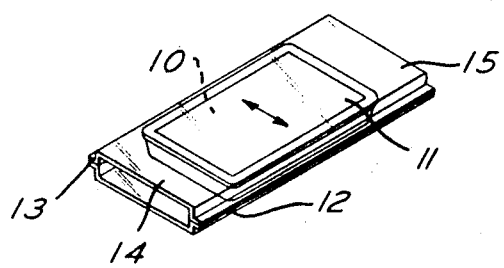
FIGURE 1B is identical to FIGURE 1A and also represents a sleeve wrapped package; however, this figure will be used in a discussion of the instant invention.

Referring now to the drawings, customary methodology and packages will be discussed in connection with FIGURES 1A, 3A, and 4A.

FIGURE 1A illustrates how an item to be wrapped, generally 10, might be wrapped using conventional methods. Item 10, as shown, is a tray or carrier. This item has been inserted and positioned within a sleeve 11 of mono-axially oriented thermoplastic film. The sleeve may be seamlessly extruded or made from two pieces of film by heat sealing edges 12 and 13. Alternatively, a piece of film, folded double along a line coresponding to edge 13, could be used, in which case only a single heat-sealed edge 12 would be present. Such heat-sealed edges can be formed, as is customary, using impulse sealers. The sleeve may be formed about the item or pre-formed and the item inserted therein. The film is oriented so that, in this case, the major shrink axis coincides with the arrows in the figure. Notice that the two ends 14 and 15 are open and identical in cross-section to the rest of sleeve 11. They are also generally equal in length.

Figure 3A:
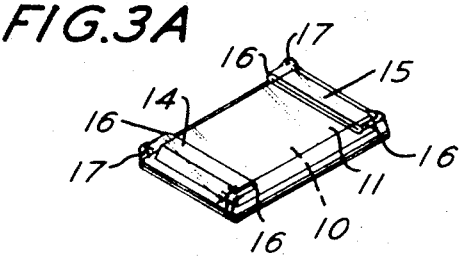
FIGURE 3A represents a perspective view of the package of FIGURE 1A with the ends of the package folded under the bottom, the entire package being inverted for clarity of representation.

The next step of the procedure is shown in FIGURE 3A. There, it will be noted, ends 14 and 15 have been manually or mechanically folded underneath the item 10 so that their surfaces are in co-planar juxtaposition to that portion of sleeve 11 which covers the bottom of item 10. Note particularly that the corners of the ends, all designated by the numeral 16 tend to protrude beyond the silhouette of container 10 and further that a bunching of film tends to occur in the areas designated by the numeral 17. Corners 16 can catch on machinery and the general appearance of corners 16 and areas 17 is sloppy. However, this configuration is inevitable unless the ends are cut to form tapered tabs.

Figure 4A:
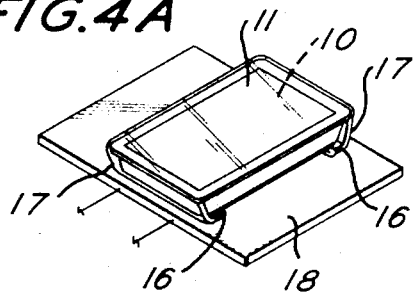
FIGURE 4A is a perspective view showing how heat sealing of the package ends might be effected following prior art methods before heat shrinking.

The next step, as shown in FIGURE 4A, is to heat seal ends 14 and 15 to the bottom of the package. This can be performed, for instance on a hot plate 18 by the simple expedient of briefly placing thereupon, in the position shown, the package illustrated in FIGURE 3A. The package is then removed from the hot plate and passed through a heat tunnel or some other equipment adapted to heat the film and cause shrinkage along the axis shown by the arrows in FIGURE 1A. After this shrinkage has occurred, the film tightly bands item 10 but corners 16, because they have been sealed, remain as shown in the figures and the bunched area 17 are accentuated. This represents the current technology and the result is a package with protuberances, bunched areas and ends which are not consistent in appearance and tightness to that intermediate portion of the package which has been placed into heat-shrunk tensioned contact with item 10.

The steps of the instant invention as well as the packages resulting therefrom are shown in the remaining figures. One embodiment of the invention involves the seriatim steps shown in FIGURES 1B, 2, 3B and 4B. Another embodiment of the invention is shown by the seriatim steps represented in FIGURES 1B, 2, 3C, and 4C.

Figure 2:
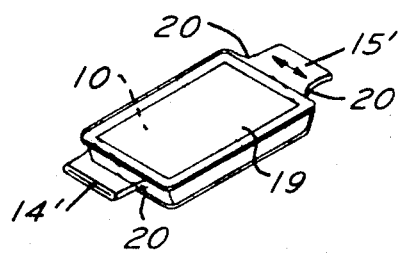
FIGURE 2 represents a perspective view of the package of FIGURE 1B after it has been heat shrunk.

The first step of the invention is identical to the prior art steps represented in FIGURE 1A. That is, encasing the item in a sleeve as by the formation of a package having ends 14 and 15 as well as heat-sealed edges 12 and 13. From this point on, there is radical deviation. The next step in the instant invention (not illustrated) is the heat shrinking of the package shown in FIGURE 1B. The package is passed through a heating zone and the result is a shrinkage along the axis indicated by the arrows in FIGURE 1B. The resulting package is shown in FIGURE 2, which should be carefully considered. As noted in the figure, end 14 has shrunken in the direction shown by the arrows to form an end 14' and end 15 has similarly shrunken to form end 15'. Whereas initially the cross-section of end 14 was identical to the cross-section in the middle of sleeve 11 it has now been greatly reduced in cross-section by an amount reflective of the shrink capabilities of the film. In intermediate vicinity 19, however, the cross-section of film 11 is in skin tight conformation to the cross-section of item 10 with shrink tensions having been built up in the film. Note that where ends 14' and 15' join the film which overwraps item 10, the transition includes fillets 20. The shrinkage of ends 14 and 15 tends to diminish the entire cross-section thereof so as to almost completely seal these ends. While the package may have utility as shown in FIGURE 2, where ears are desired, most often additional steps are performed.

Figure 3B:
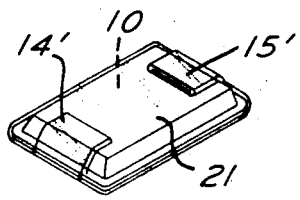
FIGURE 3B represents an inverted view of the package of FIGURE 2 with the ends tucked under the bottom.

For instance, after the heat shrinking step, during the course of which the package shown in the FIGURE 2 was formed, the end 14' and 15' may be folded underneath the package, either manually or mechanically. The package, with the ends so folded, is shown in FIGURE 3B and this figure should be contrasted to the appearance of the package shown in FIGURE 3B. Note that in FIGURE 3B there are no equivalents of protruding corners 16 or bunched areas 17.

Figure 4B:
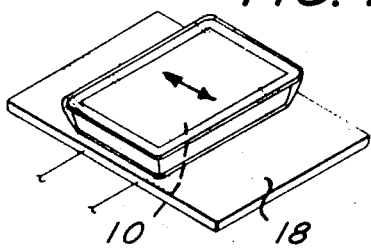
FIGURE 4B represents the package of FIGURE 3B in the process of having its ends heat-sealed to its bottom.

The final step is illustrated in FIGURE 4B where the package of FIGURE 3B is placed upon a hot plate 18 or some other device to cause heat-sealing of ends 14' and 15' to portion 21 of sleeve 11, which covers the bottom of item 10. This same sealing action completely closes the package and makes it air-tight since the ends are sealed to themselves and to film portion 21 at the same time.

Figure 3C:
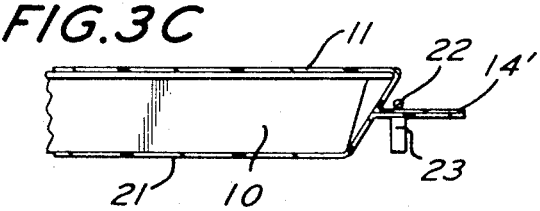
FIGURE 3C represents an alternative method of treating package of FIGURE 2 and is a fragmentary section showing the end flap of the package upon which the method of the invention is being practiced.
Figure 4C:
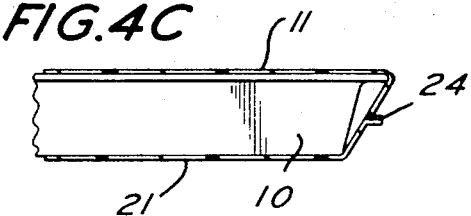
FIGURE 4C is a fragmentary section of the package shown in FIGURE 3C after completion of the package operation.

In the modified form of the invention shown in FIGURES 3C and 4C, a package is produced which is different in appearance from the package shown in FIGURE 3B. The steps involved are the following: The package shown in FIGURE 2 has ends 14' and 15' which are almost closed on a line connecting the paired fillets 20. A heat-sealing device is used to seal and cut-off the ends across such a line.

In FIGURE 3C, there is shown diagrammatically an impulse sealer which comprises a heated wire 22 which operates against an anvil 23. End 14' is placed between the wire and the anvil and the temperature of the wire raised sufficiently to simultaneously create a heat-sealed edge 24 and cut-off that portion of end 14' which, in FIGURE 3C, appears to the right of the heated wire.

It will thus be seen that the fundamental concept of the invention involves the shrinking of the package before the ends thereof are subjected to further manipulation. By this shrinking the ends are so decreased in size as to avoid gathering, bunching, and similar indicia of excess film which result in packages having a sloppy appearance. Further, because the ends are so shrunken, alternative methods of packing are available such as those discussed in connection with FIGURES 3C and 4C. This technique enables packers to use mono-axial film in applications where they had been previously able to use only bi-axially oriented film. Since the cost of mono-axially oriented film is about 25 percent less than that of bi-axially oriented film, there is an immediate saving.

Having described my invention what is claimed is:

1. A method of wrapping comprising the steps of:
  (a) encasing an item to be wrapped in a sleeve of mono-axially oriented thermoplastic film with the major shrink axis positioned transversely to the longitudinal extent of said sleeve, said sleeve extending longitudinally beyond said item to form two ends;
  (b) heating said overwrapped item whereby said ends shrink transversely and the portion of the sleeve intermediate said ends contracts transversely about said item in tensioned, heat shrunk juxtaposition;
  (c) folding said ends under the item encased in the sleeve, and
  (d) heat sealing said ends to said sleeve.

2. A package made in accordance with the method of claim 1.

References Cited

UNITED STATES PATENTS

| | | | |
|---|---|---|---|
| 3,113,408 | 12/1963 | Kirkpatrick et al. | 53—30 |
| 3,392,504 | 7/1968 | Vates | 53—30 X |
| 3,187,477 | 6/1965 | Dreyfus | 53—30 |
| 3,277,628 | 11/1966 | Harrison | 53—30 |

TRAVIS S. McGEHEE, Primary Examiner

U.S. Cl. X.R.

53—30; 206—45.33; 229—87